United States Patent
Lafon et al.

(10) Patent No.: US 7,190,388 B2
(45) Date of Patent: Mar. 13, 2007

(54) COMMUNICATION TERMINAL AND SYSTEM

(75) Inventors: Michel Beaudovin Lafon, Paris (FR); Nicolas Roussel, Dijon (FR); Jacques Martin, Noyarey (FR); Jean-Dominique Gascuel, Meylan (FR); Georges Buchner, Paris (FR); Hervé Lissek, Grenoble (FR)

(73) Assignee: France Telecom, Paris (FR)

( * ) Notice: Subject to any disclaimer, the term of this patent is extended or adjusted under 35 U.S.C. 154(b) by 449 days.

(21) Appl. No.: 10/332,161

(22) PCT Filed: Jun. 22, 2001

(86) PCT No.: PCT/FR01/01981

§ 371 (c)(1),
(2), (4) Date: Aug. 26, 2003

(87) PCT Pub. No.: WO02/03692

PCT Pub. Date: Jan. 10, 2002

(65) Prior Publication Data

US 2004/0068736 A1   Apr. 8, 2004

(30) Foreign Application Priority Data

Jul. 4, 2000   (FR) .................................. 00 08670

(51) Int. Cl.
*H04N 7/14* (2006.01)

(52) U.S. Cl. ................. 348/14.01; 348/14.08

(58) Field of Classification Search .. 348/14.01–14.16; 379/93.21, 93.23, 93.17, 202.01; 709/204
See application file for complete search history.

(56) References Cited

U.S. PATENT DOCUMENTS

| | | | |
|---|---|---|---|
| 3,888,576 A | 6/1975 | Bolgar et al. | |
| 4,918,535 A | 4/1990 | Grabis et al. | |
| 5,639,151 A | * | 6/1997 | McNelley et al. ....... 348/14.07 |
| 6,304,648 B1 | * | 10/2001 | Chang ..................... 348/14.08 |
| 6,330,022 B1 | * | 12/2001 | Seligmann ............... 348/14.08 |
| 6,798,441 B2 | * | 9/2004 | Hartman et al. ......... 348/14.08 |

FOREIGN PATENT DOCUMENTS

| DE | 38 16 093 A1 | 11/1989 |
|---|---|---|
| FR | 2 761 562 A | 10/1998 |

OTHER PUBLICATIONS

Copy of International Search Report established for PCT/FR01/01981.

* cited by examiner

*Primary Examiner*—Stella Woo
(74) *Attorney, Agent, or Firm*—Drinker Biddle & Reath LLP (57) ABSTRACT

A videoconference terminal comprises image restoring means having a display arranged substantially horizontally. The terminal preferably has the shape of a well seat closed at one end by the display, thereby enabling a large number of users to distribute the space around the display. This makes the terminal an original and convivial communication equipment dedicated to informal communications between users distant from one another.

23 Claims, 4 Drawing Sheets

COMMUNICATION TERMINAL AND SYSTEM

TECHNICAL FIELD

The invention relates to a communication terminal, as well as to a communication system incorporating the same.

It applies to the field of group communication systems in interactive mode or in broadcast mode, and more especially multimedia systems such as videoconferencing systems. Here, the expression videoconferencing system will refer very generically to any video communication system making it possible to establish links with at least two of the following three media: sound, video, data, between individuals or groups, in a symmetric or asymmetric bilateral manner. Such systems enable one or more users present on a first specified site, to communicate verbally with one or more users present on at least one second specified site, distant from the first site, and enable each user of a site to see the image of a user of another site in spatial location coherent with the sound generated thereby. Several pairwise distant sites may thus be linked by an adapted communication or broadcasting network, in general a digital network such as the ISDN (Integrated Services Digital Network) or ATM (standing for "Asynchronous Transfer Mode") or ABSL (standing for "Asymmetric Digital Subscriber Line") or IP, or the like, in point-to-point mode or in multipoint (or multisite) mode. Audio data, corresponding in particular to the sounds produced by the users, and likewise video data, corresponding in particular to the image of the users, are transmitted via this network. In what follows, the term "local" is used with reference to said first specified site and the term "distant" is used with reference to the second specified site, it being understood that any site is both a local site and a distant site, depending on whether one adopts the point of view of one or the other site.

The invention relates to the end part of such a system, referred to as the "terminal". From the transmission point of view, it uses the same network supports and the same protocols as those used for videoconferencing, for videophony, telebroadcasting, or the like. The terminal according to the invention could be substituted for conventional audiovisual terminal equipments (televisions, videophones, videoconferencing equipments, etc).

BACKGROUND OF THE INVENTION

The known videoconferencing equipments comprise, in each specified site, picture capture means such as a video camera and sound capture means such as a microphone, which respectively allow the acquisition of the image and the acquisition of the sound of the voice of a local user. Moreover, they also comprise image restitution means, such as a video projector cooperating with a projection screen, and sound restitution means, such as loudspeakers, which respectively allow the restitution of the image and the restitution of the sound produced by a distant user.

All these means are customarily situated in a scheduled room equipped for this purpose, the so-called videoconferencing room or studio, which is generally locked outside of conferences in order in particular to prevent the theft of the hardware. A videoconference would therefore be organized in advance, and presupposes a scheduled appointment between the users who are summoned to assemble in the videoconferencing studio at a precise date and precise time, the conference having a precise aim, generally professional. Videoconferences constitute formal meetings. In each site, the users sit down in front of a table, the screen being arranged vertically on the other side of the table. They behave as if they were seated at a meeting table, and as if the distant users were seated facing them, on the other side of the table.

All these constraints make the videoconferencing service rather user-unfriendly since it is adapted to so-called "formal" communication only. In fact, this service is still largely reserved for the professional domain, that is for the business world. Certainly, solutions have been proposed to improve the copresence effect afforded by videoconferencing systems. For example, in the document FR-A-2 761 562, means of spatially distributing the sound are proposed so as to establish a correspondence between the sound generated by each distant participant and his image displayed on the screen of a relevant site. Nevertheless, for the reasons indicated hereinabove, videoconferencing systems have not yet become the instruments of remote user-friendliness that might have been expected.

SUMMARY OF THE INVENTION

The invention allows the implementation of a videoconferencing system beyond the current uses, and thus to make the appearance of a new form of remote user-friendliness easier, the informal encounter between mutually distant individuals.

The invention thus proposes a communication terminal for a videoconferencing system between one or more local users and one or more distant users, comprising:

optionally but not necessarily picture capture means for producing video data corresponding to the image of the local users;
  sound capture means for producing audio data corresponding to the sound generated by the local users;
  image restitution means comprising a screen arranged substantially horizontally, for restoring on the screen at least the image of a distant user based on image data;
  sound restitution means for restoring the sound generated by the distant user based on audio data;
    optionally but not necessarily, means of transmitting computer data coding additional images or deformation effects for the restored image.

The horizontal arrangement of the screen of the terminal according to the invention allows a large number of people to distribute themselves around, beneath or above it without impeding one another.

The invention in fact proposes several embodiments making it possible to envisage new applications of video communication, in the mass-market field or the like.

The terminal exhibits for example the general form of a well, around, above or beneath which the users can distribute themselves, this being in fact an original, attractive and user-friendly communication equipment.

The invention also proposes a communication system incorporating such a terminal. Such a terminal is multimedia and can be interactive. It allows communication between groups of mutually distant people.

DESCRIPTION OF PREFERRED EMBODIMENTS

In the drawings, same elements bear same references.

Figure 1:
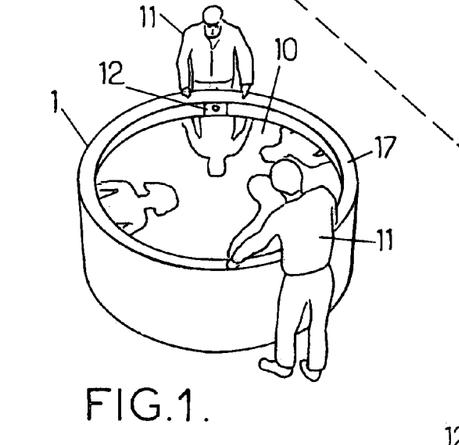
FIGS. 1 to 3 are diagrams respectively of a first of a second and of a third exemplary application of terminals according to the invention.

Represented in FIG. 1 are two terminals 1 and 2 of a videoconferencing system according to the invention. These two terminals are distant from one another. The actual distance between the two terminals 1 and 2 depends on the application. It may range from a few meters to several hundred or several thousand kilometers. By convention, in what follows we adopt the point of view of the site of the terminal 1. Stated otherwise, the site of the terminal 1 is called the local site and the site of the terminal 2 is called the distant site. The image and the sound of the voice of a distant user of the first terminal correspond respectively to the image and to the sound of the voice of a local user of the second terminal, and vice versa.

Each terminal 1 or 2 comprises a screen 10 or 20 respectively. The screen of a terminal is arranged in a substantially horizontal manner. This implies that the plane of the screen exhibits a zero or small angle (for example less than 15 degrees) with the horizontal. The screen is preferably planar, but may also have a bulging shape or the form of a polygonal pyramid, in a concave or convex manner.

The screen is for example a diffusing screen, opaque or translucent, a screen of the CRT type (standing for "Cathode Ray Tube"), a plasma screen, a liquid crystal screen, or the like. It may also be a screen adapted to stereoscopy, namely a screen of the aforesaid type covered with an appropriate lenticular network or a screen comprising optical valves (liquid crystal or PLZT, etc.) which alternately address the left view to the left eye and the right view to the right eye by means of appropriate glasses. In a preferred embodiment, it is a translucent diffusing screen, such as a frosted glass panel.

Preferably, the terminal exhibits the general form of a well closed at one of its ends by the screen. The other end forms the bottom of the well.

In this way, local users can distribute themselves around the screen without impeding one another. The shape of the well, in section in the plane of the screen, may be circular as shown in FIG. 1, polygonal or the like. It will be noted that it may also take the shape of a non-closed curve.

In a preferred exemplary application of the invention, in accordance with the diagram of FIG. 1, the height of the well, reckoned from the level of the floor on which the local users 11 are standing, is for example substantially equal to the height of a table (typically 0.72 m when the users are seated, or even more, for example a meter when the users are standing up). The bottom of the well then rests on the floor.

As will be specified later, a video projector is preferably installed inside the well. To increase the back-off of the video projector without increasing the height of the well, it is possible to add a podium around the well, and on which the local users can stand. The well can also be installed in a pit made in the floor, in such a way that the bottom of the well is beneath the level of the floor. The size of the screen can thus be increased.

A transparent protective glazing can cover the screen, so that the user is able to rest against or place an object on the terminal without any risk of damaging the screen. As a variant, the protective glazing can be replaced with a touch-sensitive glazing or pane of glass, so that the screen becomes a touch screen. The glazing or the pane are treated in such a way as to avoid the reflection of the local users leaning on the screen. As a variant, a layer of anti-reflection material is applied to that face of the screen pointing toward the local users.

Figure 2:
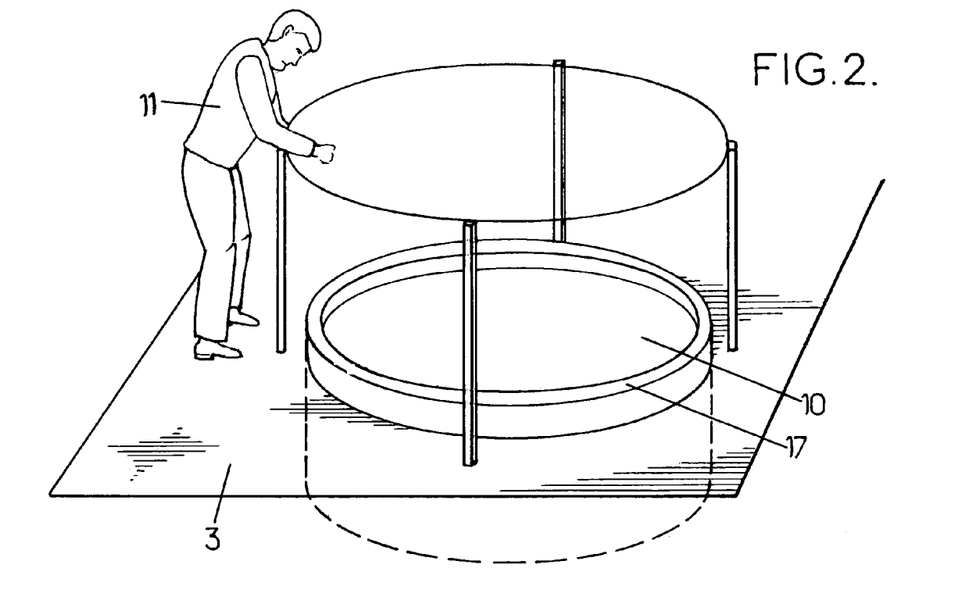

In another exemplary application, in accordance with the diagram of FIG. 2, the terminal 1 is installed so that the screen 10 is substantially level with the floor on which the users 11 are standing. A handrail 18 can be installed around the well, to allow the local users to rest on it in order to lean over the well. In this way, the users can distribute themselves around the well. As a variant, there is no handrail and the users can stand above the well.

Figure 3:
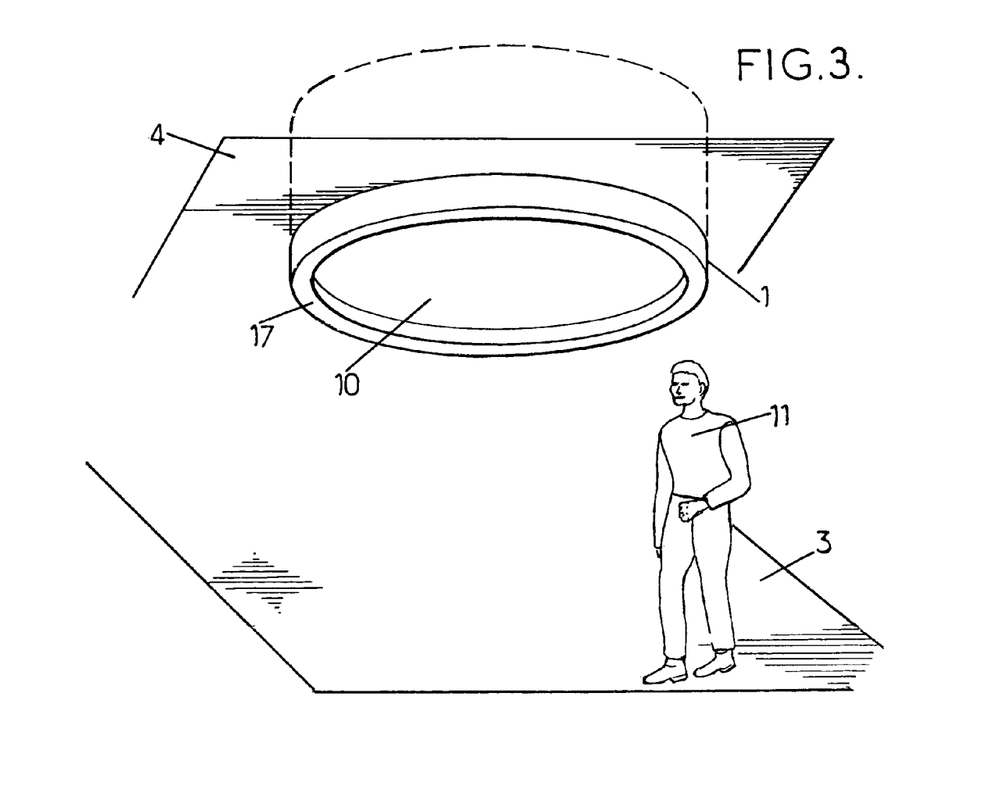

In another example, in accordance with the diagram of FIG. 3, the well 1 extends downward from the ceiling 4 of the room in which it is housed. In this example, the plane of the screen 10 lies above the head of the users 11 (for example 2.5 meters from the level of the floor 3 on which the users 11 are standing). In this way, the users can arrange themselves around and beneath the screen 20. They can also sit down in armchairs which are relatively inclined in such a way as to be in a more comfortable position.

Figure 4:
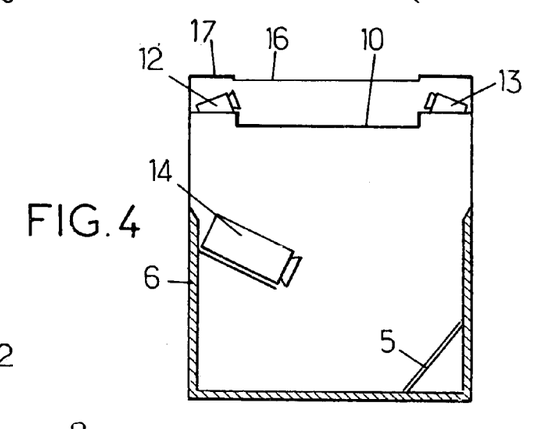
FIG. 4 is the simplified diagram of a terminal, in section, showing the video means of the terminal.

In FIG. 4 in a diagram sectioned along an axis A-B (visible in the diagram of FIG. 5b) have been represented the video means of a terminal according to the invention. These video means comprise on the one hand the picture capture means and on the other hand the image restitution means. The aforesaid protective glazing is visible in FIG. 4 and bears the reference 16.

The picture capture means comprise one or more cameras. In the example represented, there are three cameras, only two of which 12 and 13 are visible in the figures. The cameras preferably are arranged inside a rim 17 of the well, where they are protected. The optical axis of each camera is inclined with respect to the plane of the screen in such a way as to be able to produce data relating to the image of a local user standing in a specified position around the well (here on the other side of the well, opposite the relevant camera).

Markings on the floor, or zones demarcated on the rim 17 or the like can indicate for the local users the specified zones where they must stand. This avoids having to shift the cameras. As a variant, the cameras are mobile and coupled to an appropriate tracking device.

In order to allow stereoscopy, several cameras can simultaneously capture the image of a local user, at slightly offset angles so as to create the effect of stereoscopic disparity. As a variant, stereoscopy can also result from the local users employing polarized glasses.

In the case where the screen is a translucent diffusing screen (here glass frosted using acid or by sandblasting its surface), the image restitution means comprise at least one video projector 14 arranged on the opposite side of the screen 10 from the local users 11. Stated otherwise, the image restitution means operate by back projection. Preferably, the projector 14 is arranged inside the well, in such a way that the video signal which it produces will illuminate that face of the screen 10 pointing toward the bottom 19 of the well. In this way, it is protected and, moreover, it is not visible from outside the well. In the example represented, the optical axis of the projector 14 is inclined with respect to the plane of the screen 10 in a direction opposite to it and is oriented toward a mirror 15 arranged in the well in such a way as to reflect the optical signal generated by the projector 14 toward to the screen 10. This makes it possible to increase the size of the image projected on the screen 10 as compared with direct projection. Other mirrors such as the mirror 15 can also be used. The number and the shape of these mirrors depend on the disposition of the projector 14 in the well.

Figure 5A:
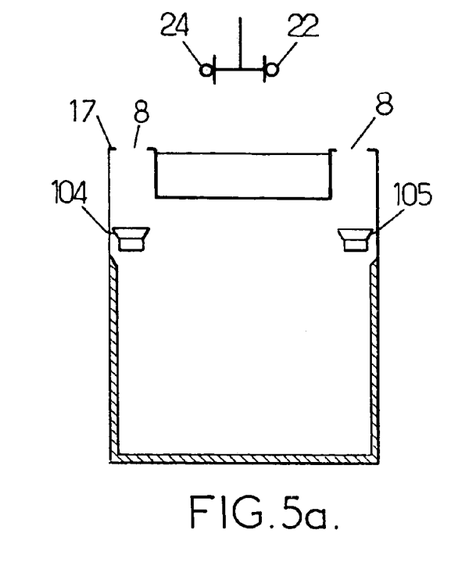
FIG. 5a and FIG. 5b are simplified diagrams of a terminal, respectively in section and viewed from above, showing the audio means of the terminal.
Figure 5B:
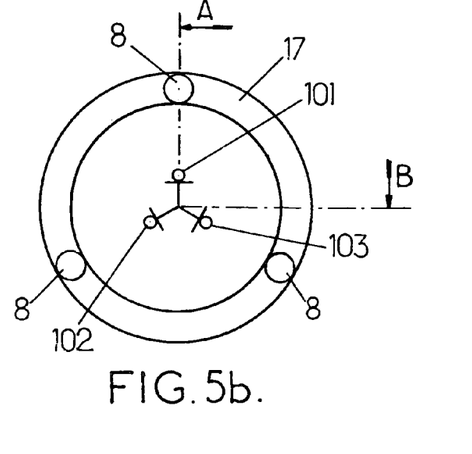

Represented in FIG. 5a in a vertical sectional view along an axis A-B is a terminal according to the invention. Represented in FIG. 5b is a view from above of the terminal according to the invention. The audio means of the terminal have been represented in these figures. These means comprise on the one hand the sound capture means and on the other hand the sound restitution means of the terminal.

The sound capture means comprise microphones. In the example represented these microphones are three in number, and bear the references 101, 102 and 103. The three microphones 101 to 103 are for example suspended above the center of the screen 10 and form pairwise an angle of 120 degrees. They are preferably directional microphones, with cardioid, hypercardioid or some other directionality, oriented from the center toward the periphery of the screen 10. A microphone is oriented in such a way as to produce audio data corresponding to the sound generated by a local user standing or moving in a specified zone with respect to the screen or with respect to the cameras. In an example, the microphones are arranged substantially at the height of the mouth of the local users 11, and they face the cameras. The users are framed by the cameras, and they can speak between two microphones. As a variant or as an adjunct, the sound capture means comprise an omnidirectional microphone. Preferably, this microphone is then coupled to an echo cancellation device.

The sound restitution means, comprise loudspeakers. In the example represented in the figure, the loudspeakers are three in number. Only two of them 104 and 105 are visible in FIG. 5a. They are for example arranged in the rim 17. In this way, they do not clutter the space at the center of the well, through which the optical signal produced by the video projector 14 passes. Moreover, they are then protected. Preferably, the loudspeakers are uniformly distributed at the periphery of the well. Advantageously, they are arranged on the opposite side of the screen 10 from the local users 11, that is to say on the side of that face of the screen 10 pointing toward the bottom 19 of the well. In this way the local users 11, whose ears and eyes are situated on the opposite side of the screen 10 from the bottom 19 of the well have the impression that the sound is coming from the bottom of the well. This gives the impression that the people speaking are actually in the well. The sound issues from the rim 17 through vents 8 made on its surface.

The microphones 101 to 103 are for example secured to a suspension fixed to a system of arches (not represented) forming a gantry above the screen 10. These arches are for example fixed to the vertical walls or to the rim 17 of the well. They delimit the placement of the users. The loudspeakers 104 to 106 are, preferably, mounted on an appropriate suspension. The suspension mounting of the loudspeakers and/or of the microphones makes it possible to avoid any risk of "solid-state" coupling between the former and the latter.

As an adjunct or in place of the aforesaid loudspeakers, the sound restitution means can comprise flat, transparent loudspeakers held, for example by adhesive bonding, on the face of the screen 10 away from the bottom 19 of the well (that pointing toward the local users 11). The sound restored by these loudspeakers is then in subjective correspondence with the image restored on that zone of the screen 10 on which they are arranged. Such loudspeakers have recently made their appearance on the market and are offered, for example, by the company NXT Corporation.

As a variant, the aforesaid flat loudspeakers are not transparent. The video restitution means then comprise a projector arranged on the same side of the screen as the local users, the screen being in this case an opaque diffusing screen.

The internal walls of the well are preferably lined with an acoustic absorbing material 6 making it possible to avoid the "sounding board" effect inside the well.

Figure 6:
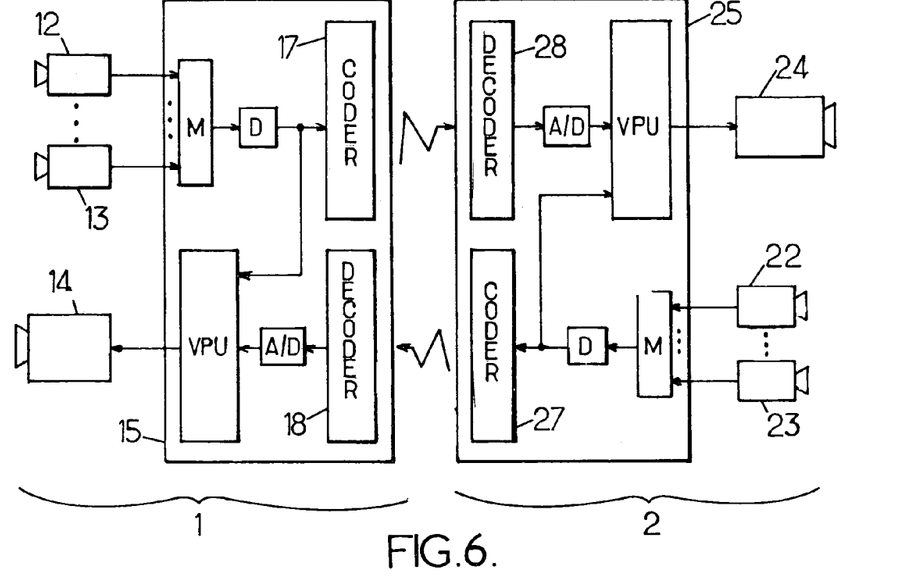
FIG. 6 is a diagram showing the image processing means of two terminals.
Figure 7:
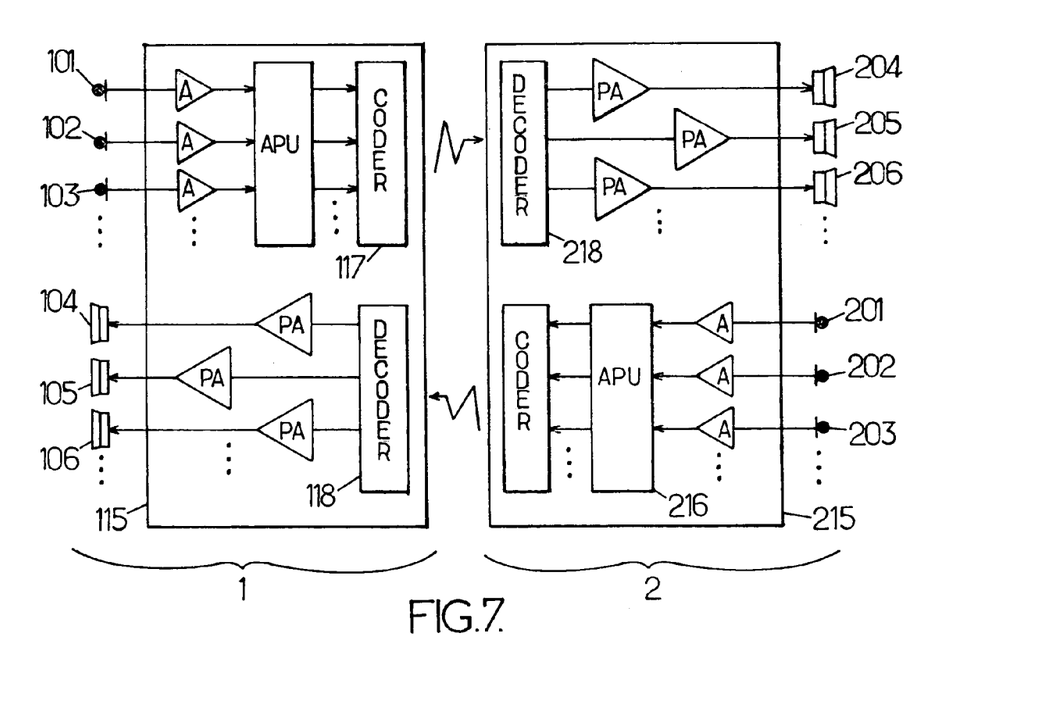
FIG. 7 is a diagram showing sound processing means of the two terminals.

Each device comprises a management unit comprising audio processing means and video processing means. These two types of means will now be described separately with reference respectively to the diagrams of FIG. 6 and of FIG. 7. This separate presentation has been chosen for the sake of convenience. Nevertheless, these two groups of means obviously make up a functional unit, in such a way that the sounds and the images restored in each terminal are in coherence with one another. In the diagrams of FIGS. 6 and 7 is considered the example of a point-to-point videoconferencing system between the terminals 1 and 2.

The video management unit 15 of the terminal 1 comprises an image composition matrix M receiving as input the video signals generated by the cameras 12 and 13. The output of the matrix M is coupled to the input of a light flux duplicator D.

The output of this duplicator D is connected to the input of a video coder 17. The compressed video data at the output of the coder 17 correspond to at least one image of a local user 11 (FIG. 1). They are transmitted to the distant terminal 2 by way of a communication network via interfaces (not represented) appropriate to the type of network used for transmission.

The output of the duplicator D is furthermore connected to the video input of a digital video processing unit VPU, such as a station of the SGI family offered by the company Silicon Graphics or any other real-time image processing facility allowing the composition of images, trick effects, image inlaying, etc.

It also comprises a data input for receiving, via an analog/digital converter A/D, video data delivered by the output of a video decoder 18. These video data are transmitted from the distant terminal 2 by way of the communication network via the appropriate interfaces (not represented). They correspond to at least one image of a distant user 21 (FIG. 1).

The video output of the VPU unit is connected to the video input of the video projector 14. It delivers for example a video signal for an image in the 1024×768 (pixels) format.

The VPU unit carries out the following functions:

- acquisition of the local images produced by the cameras, with a view to their restitution by the local terminal itself;
- management of stereoscopy;
- composition of the local images and/or of the distant images, either by merging or by superposition, as will be made explicit later;
- restitution of the composed image;
- possibly video trick effects, so as to produce special effects, for example in order to add disturbances to the restored image which produce an effect of deformation of the restored image; such a deformation can correspond to ripples on the screen, in order to simulate the agitation of the surface of the water and thus to increase the similarity to a real well; the screen can then be a touch screen, the ripple effect being produced when a local user touches the screen; these deformations can be coded by computer data transmitted with the audio data and the video data, for example according to the ITU T120 protocol or the like;
- possibly also, digital or analog inlaying of additional video images coded in the JPEG format (for example drawings, plans, graphics, or the like making it possible to illustrate the intention of the users); these additional images, which do not correspond to images captured by the picture capture means according to the invention, are coded by computer data transmitted with the audio data and the video data, for example according to the ITU T120 protocol or the like.

By composing an image from the local images and the distant images, each user is enabled to see the other users on the screen, including those who are located on the same site as him/her. This avoids the head movements of the local users, visible by the distant users, going from the screen to the face of the other local users. Furthermore, this enables each local user to position himself around the well as if the two groups of users (local and distant) were one single group of people present around the well.

The coding of the data transmitted from one terminal to another has the aim of compressing the video data so as to limit the bandwidth required for transmission, this making it possible to adapt the bit rate to the lines offered by telecommunication operators. The coder 17 and the decoder 18 are for example a coder and a decoder of MPEG type (standing for "Moving Pictures Experts Group"), that is they comply with the video films compression standard of the Moving Pictures Experts Group. It may also be a coder of the ITU H263 type (standing for "International Telecommunication Union") or of the AVI type (standing for "Audio Video Interleaved").

On the right-hand side of FIG. 6 is likewise represented the diagram of a management unit 25 of the distant terminal 2. This unit 25 being identical to the management unit 15 of the local terminal 1, it will not be described again. It will be noted that the elements of the distant terminal 2 corresponding to the elements of the local terminal 1 which are visible in particular in FIG. 6, bear the same reference as them with, in respect of the tens digit, the numeral 2 instead of the numeral 1.

Of course, more than two cameras may be envisaged in certain or in each of the terminals of the videoconferencing system. In this case, the video management unit of these terminals is of course modified correspondingly, as a function of the equipments available, as the person skilled in the art will immediately realize.

Likewise, in the case of a communication network in multipoint mode, that is when each terminal is connected by the network to at least two other distant terminals, it is necessary to envisage other video decoders such as the decoder 18 (one for each connected distant site). Each of these decoders then delivers decompressed video data on an appropriate data input of the VPU unit. However, these measures are not necessary when the communication network comprises a multipoint videoconferencing equipment or MCU (standing for "Multipoint Conference Unit"). It is also possible to envisage direct audiovisual links between the terminals, given that it is the VPU unit which manages the composition of the images on the screen.

Figure 8:
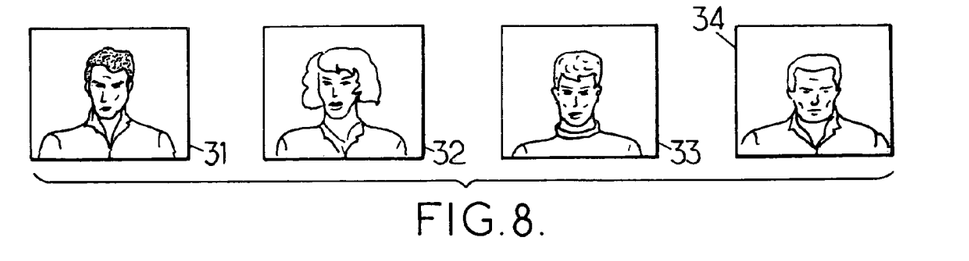
FIG. 8 is a typical image captured by the picture capture means of two terminals.
Figure 9:
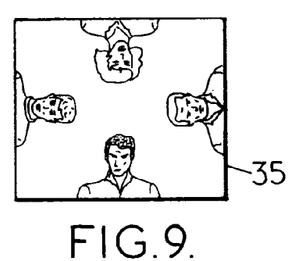
FIG. 9 is the diagram of a first exemplary composition of the images on the screen of a terminal.
Figure 10:
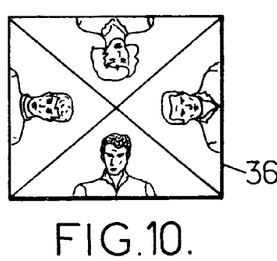
FIG. 10 is the diagram of a second exemplary composition of the images on the screen of a terminal.
Figure 11:
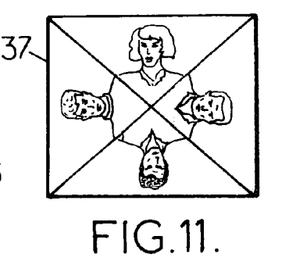
FIG. 11 is the diagram of a third exemplary composition of the images on the screen of a terminal.

Represented symbolically in FIG. 8 is an example of images 31, 32, 33 and 34 generated respectively by the cameras 12 and 13 of the local terminal 1 and by the cameras 22 and 23 of the distant terminal 2. FIGS. 9 to 11 show examples of the composition of the local and distant images which is produced by the VPU unit. The images shown in these figures are rectangular, but this in no way limits the shape of the screen which as stated earlier, may be circular, oval, polygonal or the like.

FIG. 9 shows the composed image 35 obtained by superimposing the images 31 to 34. The images are superimposed by transparency. The luminous intensity of the images thus superimposed is not necessarily identical for each image. Preferably, the luminous intensity of the image of the local users is less than that of the image of the distant users. In this way, the local users appear on the screen only in the form of shadows, of "ghosts" or the like. This mode of composition produces a homogeneous image observable by all the people gathered around the well.

FIG. 10 shows the composed image 36 obtained by merging (concatenating) the images 31 to 34. This mode of composition consists in assigning a particular zone of the restored image to each image source (camera), thus effecting a splitting of the restored image. This mode of composition produces an image exhibiting discontinuities or "crossed fades". This makes it possible to depict or to highlight the image of just one user, for example the one currently speaking. These special effects are generated by the VPU unit which mixes and adjusts the luminance levels of the images. It is for example possible for the screen zone nearest to each local user to be assigned to the image of this local user, so that the user can thus see himself on the screen as if he were seeing himself by reflection from the surface of the water in a real well.

The composed images shown in FIGS. 9 and 10 produce an identical effect to that produced by the water in a real well. Each person sees himself the right way up and sees the other people upside down.

Finally FIG. 11 shows the image 37 obtained by merging the images 31 to 34 after geometrical inversion (from top to bottom) of these images. This composition makes it possible to focus the attention of the users on the center of the screen rather than on its periphery as in the other two modes of composition. Furthermore, it allows each local user to see another person facing him/her.

In general, the composition of the images will be such that the image of a local user and that of a distant user are located opposite one another on the screen.

Preferably, the location on the screen of the sound image of a distant user is coherent with the location on the screen of this distant user's image as restored on the screen. This is achieved through appropriate control of the aforesaid VPU video processing unit and of an audio processing unit (which will now be described).

Represented in FIG. 7 are the audio processing means of the management unit 15 of the local terminal 1 (in the left part of the figure) and the corresponding means of the management unit 25 of the distant terminal 2 (in the right part of the figure). In fact these means are identical for each terminal. It will be noted that the elements of the distant terminal 2 corresponding to the elements of the local terminal 1 which are visible in particular in FIG. 7, bear the same reference as them with, in respect of the hundreds digit, the numeral 2 instead of the numeral 1.

The management unit 15 of the local terminal 1 comprises a digital audio processing unit APU embodied for example in the form of one or more DSPs (standing for "Digital Signal Processors") or in the form of digital audio cards for a PC type computer. Analogue or digital inputs of the APU unit are connected to the microphones 101, 102 and 103 via analog preamplifiers A. Analogue outputs of the APU unit are connected to an audio coder 117 such as a coder of the MP3 type (standing for "MPEG—Layer III", which designates the audio data compression standard for the Internet) or processed according to the standardized modes for telecommunication (ITU G711, G742, G748, G723, G729, etc. depending on the bit rate) so as to produce compressed audio data. These compressed audio data correspond to the sounds generated by the local users and picked up by the microphones 101 to 103. These data are transmitted by way of the communication network via appropriate interfaces (not represented) to the distant terminal 2.

The management unit 15 further comprises an audio decoder 118 which is the dual of the audio coder of the management unit 25 of the distant terminal 2, such as an MP3 or G7xx decoder (see above). The decoder 118 receives audio data from the communication network (not represented) connecting the local terminal 1 to the distant terminal 2 via the appropriate interfaces (also not represented). Analogue or digital outputs of the decoder 118 are connected, via respective power amplifiers PA, to the loudspeakers 104, 105 and 106 of the sound restitution means. The sounds restored by these loudspeakers from said audio data correspond to the sounds generated by distant users 21 (FIG. 1).

A microphone of the local terminal 1 is associated with a loudspeaker of the distant terminal 2. For example, the microphones 101 to 103 of the terminal 1 are respectively associated with loudspeakers 204 to 206 of the terminal 2. Likewise, a loudspeaker of the local terminal 1 is associated with a microphone of the distant terminal 2. For example, the loudspeakers 104 to 106 of the terminal 1 are respectively associated with the microphones 201 to 203 of the terminal 2.

The APU unit carries out the following functions:
the acquisition of the audio data corresponding to the sounds picked up by the microphones 101 to 103.
the control of the spatial effect, that is to say the control of the spatial coherence of the audio data corresponding to the sound generated by each local user with the video data corresponding to the respective image of the local users, which are produced by the management unit 15;
possibly echo cancellation and/or anti-reverberation effects;
possibly also additional sound effects, such as an effect giving the impression that the users are speaking from the bottom of a real well; another interesting sound effect is the so-called "pan-pot" spatial effect, equivalent to stereophony in a plane, in this instance that of the screen; the "pan-pot" effect corresponds to stereophony with several reproduction pathways; this effect is obtained, in a configuration with at least three local loudspeakers associated with three distant microphones, by ranking the levels (intensity) at the output of the microphones and by choosing the association of the local loudspeakers and of the distant microphones as a function of this ranking; this enables the sound image of a distant speaking party to be positioned in a specified zone of the plane of the screen; this zone is naturally chosen in such a way that its location on the screen is coherent with the location of the distant speaking party's image restored on the screen.

The control of the spatial effect supplements the effect produced naturally by the directionality of the microphones. For example, if one considers a pair of directional microphones and their pair of associated loudspeakers, this effect corresponds to a simple stereophonic effect. However, with three loudspeakers at least, a spatial effect of the "pan-pot" type allows the sound image to move in a plane corresponding to the plane of the screen.

Echo cancellation is useful in particular if the sound capture means comprise an omnidirectional microphone. However, apart from the echo problems, it also makes it possible to overcome the problems of the stability of the audio loops.

The local microphones pick up the sounds generated by the local users. These sounds are restored by the distant loudspeakers and can be picked up by the distant microphones. They are then restored by the local loudspeakers. They can in their turn be picked up by the local microphones, etc. Consequently, in the event of coupling between the microphones and the loudspeakers of a terminal, there is acoustic feedback whose stability must be ensured so as to avoid saturation of the audio means (by the "Larsen" effect).

In the preferred exemplary embodiment of the terminals, the acoustic stability stems essentially from the directionality of the microphones, which is associated with the acoustic diffraction on the flange of the rim 17 of the well.

Enhanced stability can be achieved by choosing a second-order cardioid directionality or hypercardioid directionality. The directionality of the microphones also has the advantage of improving the spatial effect.

The risk of coupling between the microphones and the loudspeakers may furthermore be advantageously reduced by adhering to the following measure. The loudspeaker of the local site which is associated with the microphone of the distant site which is nearest the loudspeaker of the distant site associated with a specified microphone of the local site, is the furthest possible from said specified microphone of the local site. The terms "near" and "far" implicit above extend to the acoustic sense, that is they refer respectively to strong coupling and to weak coupling, having regard to the directionality of the microphones and/or of the loudspeakers, the diffractions, reflections and/or acoustic absorptions involved in their installation, and generally to all the acoustic disturbances entailed by the hardware installation of the elements of the relevant terminal.

Figure 12:
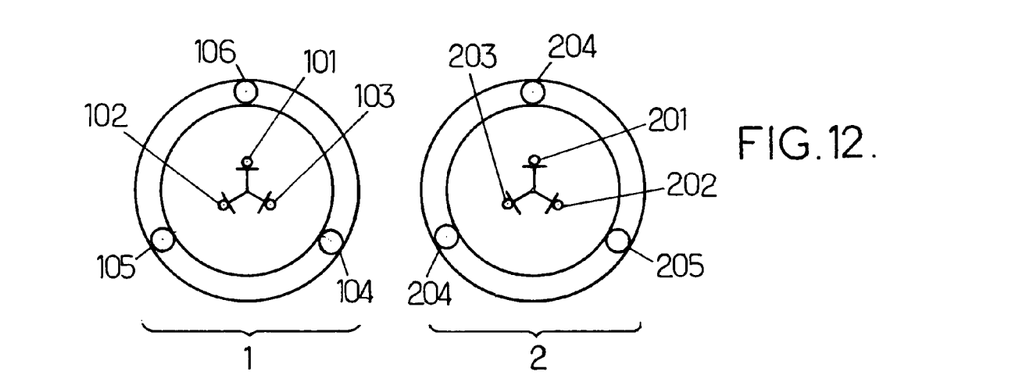
FIG. 12 is an exemplary relative layout of the sound capture means and of the sound restitution means of the two terminals.

The diagram of FIG. 12 illustrates an exemplary application of this measure in the case considered earlier of terminals in the form of a well whose surface is circular, each having three microphones and three associated loudspeakers. In this figure the same elements as in FIG. 7 bear the same references. It may be seen, for example, that the loudspeaker 104 of the terminal 1, which is associated with the mike 201 of the terminal 2 which is nearest the loudspeaker 204 of the terminal 2 associated with the microphone 101 of the terminal 1, is the furthest possible from said microphone 101 of the terminal 1. In the example, the loudspeaker 104 is arranged in the rim of the well at an angular position corresponding to an angle of +120° (reckoned in the trigonometric sense) with respect to the radius corresponding to the axis of directionality of the microphone 101.

The system comprises at least two videoconferencing terminals as described hereinabove. Each terminal is distant from the other terminals. The terminals are connected by a communication or broadcasting network for the transmission of audio and video data.

In a first exemplary application, the terminals are distributed around various sites, for example the sites of various premises of a company. In this case, the network can be of the WAN type (standing for "Wide Area Network"). It may also be the Internet, a high bit rate network over ATM (standing for "Asynchronous Transfer Mode"), a network of leased lines, and generally any type of radio, wire, or optical link and/or satellite communication network.

In each site, the terminals are preferably installed in a customary meeting place, an open space forming a forum such as an entrance hall, a room for resting (where one customarily finds coffee machines), a cafeteria or quite simply a corridor. Thus placed, the terminals which, as has been stated may operate continuously, effect the connection, the interface, between the various sites.

In a second exemplary application, the terminals are distributed at various spots in one and the same site, for example they are arranged in a public place, a large room, a reception lounge, etc. It is in this type of application that the terminals may advantageously have the form of a table. In this case, the network can furthermore be of the LAN type (standing for "Local Area Network").

In these exemplary applications, the terminals can operate continuously, in such a way as to allow informal communication without appointment between mutually distant users. The wells therefore constitute, in each site, an open window onto a distant site. The users may then, by going close to the well, look into the well in order to have visual contact with a user located on the distant site. A conversation may then easily be conducted. The videoconferencing well therefore allows informal and user-friendly communication between distant users.

Other applications may also combine the first and second examples hereinabove.

When the system comprises only two terminals, these terminals are said to be connected by the network in point-to-point mode. When the system comprises more than two terminals, they are said to be connected by the network in multipoint mode.

Figure 13:
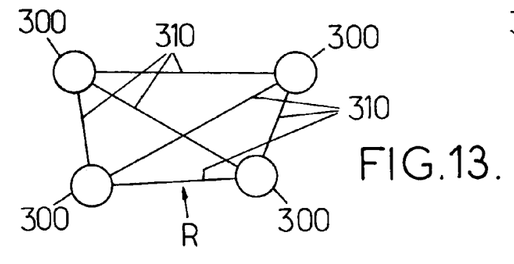
FIG. 13 is the symbolic diagram of a communication network in multipoint mode connecting the terminals of a system according to the invention.

In the example represented in FIG. 13, the system comprises a communication network R comprising links 310 for connecting the terminals 300 in multipoint mode. They are of course bidirectional links, which are symmetric or asymmetric in terms of bit rate. In this example, the network is completely meshed, that is links 310 specifically connect each specified terminal to each of the other terminals. Nevertheless, the network may be just partially meshed.

Figure 14:
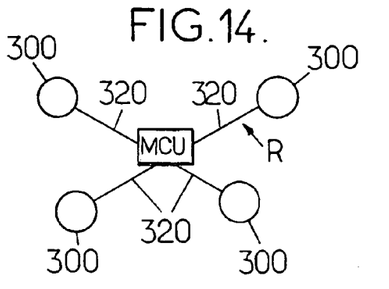
FIG. 14 is the symbolic diagram of a variant of the network of FIG. 13.

In the example represented in FIG. 14, the system comprises a communication network R comprising a Multipoint Conferencing Unit or MCU, also referred to as a videoconferencing bridge. This equipment, known per se, is connected, by a link 320, to each of the terminals 300. It carries out the multiplexing and switching of the audio and video data, or the like, originating from or heading for each of the terminals.

The invention claimed is:

1. A communication terminal for a communication system between one or more local users and one or more distant users, comprising:
   sound capture means for producing audio data corresponding to the sound generated by the local users;
   image restitution means comprising a screen arranged substantially horizontally, for restoring on the screen at least the image of a distant user based on image data;
   sound restitution means for restoring the sound generated by the distant user based on audio data; and
   wherein the terminal exhibits the general form of a well.

2. The terminal as claimed in claim 1, further comprising:
   picture capture means for producing video data corresponding to the image of the local users.

3. The terminal as claimed in claim 1, further comprising:
   means of transmitting computer data coding additional images or deformation effects for the restored image.

4. The terminal as claimed in claim 1, further comprising:
   means of composition of the image of at least one local user and of the image of at least one distant user on the screen.

5. The terminal as claimed in claim 4, wherein the means of composition operate by superimposing the image of the local user and the image of the distant user.

6. The terminal as claimed in claim 4, wherein the means of composition operate by splitting the screen into several restitution zones, a first restitution zone being reserved for the restitution of the image of the local user and a second restitution zone being reserved for the restitution of the image of the distant user.

7. The terminal as claimed in claim 1, wherein the image restitution means operate by back projection.

8. The terminal as claimed in claim 1, wherein the picture capture means comprise at least one stationary camera arranged in such a way as to produce video data corresponding to the image of a local user standing in a specified zone with respect to the screen.

9. The terminal as claimed in claim 1, wherein the sound capture means comprise at least one directional microphone oriented in such a way as to produce audio data corresponding to the sound generated by a local user standing in a specified zone with respect to the screen.

10. The terminal as claimed in claim 1, wherein the sound capture means comprise at least one omnidirectional microphone coupled to echo cancellation means in such a way as to produce audio data corresponding to the sound generated by the local users.

11. The terminal as claimed in claim 1, wherein the sound restitution means comprise several loudspeakers arranged on the opposite side of the screen from the local users.

12. The terminal as claimed in claim 11, wherein the sound restitution means comprise an audio processing unit producing a spatial effect of the "pan-pot" type.

13. The terminal as claimed in claim 1, wherein the sound restitution means comprise flat and transparent loudspeakers arranged on that face of the screen pointing toward the local users in relation to the image of the distant user.

14. The terminal as claimed in claim 1, wherein the video restitution means comprise a video processing unit producing a deformation effect for the restored image.

15. The terminal as claimed in claim 1, wherein the well is arranged with respect to the plane of the floor on which the local users are standing, in such a way that the height of the screen with respect to this plane is of the order of the average height of a table.

16. The terminal as claimed in claim 1, wherein the well is arranged with respect to the plane of the floor on which the local users are standing in such a way that the screen is substantially at the height of this plane.

17. The terminal as claimed in claim 1, wherein the well is arranged with respect to the plane of the floor on which the local users are standing in such a way that the screen is above the local users.

18. The terminal as claimed in claim 1, further comprising a management unit connected to the picture capture means, to the sound capture means, to the image restitution means and to the sound restitution means, and arranged inside the well.

19. The terminal as claimed in claim 1, wherein the internal walls of the well are lined with an acoustic absorbent lining.

20. The terminal as claimed in claim 1, wherein the picture capture means and/or the sound restitution means are arranged in a rim of the well.

21. A communication system comprising:

at least one first terminal at a first site, the at least one first terminal including:

sound capture means for producing audio data corresponding to the sound generated by the local users;

image restitution means comprising a screen arranged substantially horizontally, for restoring on the screen at least the image of a distant user based on image data;

sound restitution means for restoring the sound generated by the distant user based on audio data; and a second terminal at a second site distant from the first site, the second terminal being substantially similar to said at least one first terminal, said first terminal and second terminal being connected by a communication network and wherein the first and the second terminals exhibit the general form of a well.

22. The system as claimed in claim 21, wherein more than two terminals are connected by the network in multipoint mode, the network comprising a Multipoint Conferencing Unit.

23. The system as claimed in claim 21, wherein the terminals operate continuously, in such a way as to allow informal communication without appointment between mutually distant users.

* * * * *